United States Patent [19]
Cha et al.

[11] Patent Number: 5,739,981
[45] Date of Patent: Apr. 14, 1998

[54] MAGNETIC HEAD SUB-AMBIENT AIR PRESSURE SLIDER FOR A DISK DRIVE DEVICE OR THE LIKE

[76] Inventors: Ellis Taeho Cha, 1520 Vista Club Cir. #202, Santa Clara, Calif. 95054; Jia-Kuen Jerry Lee, 1398 Sajak Ave., San Jose, Calif. 95131

[21] Appl. No.: 707,827

[22] Filed: Sep. 4, 1996

Related U.S. Application Data

[63] Continuation of Ser. No. 358,432, Dec. 20, 1994, abandoned.

[51] Int. Cl.$^6$ .................................................. G11B 5/60
[52] U.S. Cl. .................................................. 360/103
[58] Field of Search .................................................. 360/103

[56] References Cited

U.S. PATENT DOCUMENTS 5,218,494   6/1993   Chapin .................................. 360/103

FOREIGN PATENT DOCUMENTS

| 0 387 444 A2 | 3/1989 | European Pat. Off. |          |
| 0 458 444 A2 | 5/1990 | European Pat. Off. |          |
| 0 387 444    | 9/1990 | European Pat. Off. | G11B 5/60 |
| 0 458 444    | 11/1991| European Pat. Off. | G11B 5/60 |
| 0 600 348    | 6/1994 | European Pat. Off. | G11B 17/32 |

OTHER PUBLICATIONS

"Analysis and Performance Characteristics of the Seagate Advanced Air Bearing Slider", by Cal Hardie, Aric Menon, Peter Crane and Dale Egbert, 1994, *IEEE*.

Hardie, Cal et al., "Analysis and Performance Characteristics of the Seagate Advanced Air Bearing Slider," *IEEE Transactions on Magnetics*, vol. 30, No. 2, 1 Mar. 1994, pp. 424–432.

*Primary Examiner*—A. J. Heinz

[57] ABSTRACT

A sub-ambient pressure, air bearing slider is disclosed for positioning a magnetic read/write head proximately to a rotating disk. The slider includes first and second rails extending along the side of the slider facing the rotating disk from a leading edge of the slider to a trailing edge of the slider. Each rail has a thigh region extending at an angle from the leading edge to a lateral side of the slider, a foot region extending at an angle from a lateral side of the slider toward the trailing edge of the slider, and a knee region at a lateral side of the slider coupled between the foot and thigh regions. Recesses are provided to shape the first and second rails. A central recess provides a volume for sub-ambient pressure. One or more tails can be placed within the central region to prevent the shifting of pressure completely to one side of the slider. The design of the first and second rails leads to a more uniform flying height for the slider and magnetic head over all tracks of the disk.

24 Claims, 7 Drawing Sheets

MAGNETIC HEAD SUB-AMBIENT AIR PRESSURE SLIDER FOR A DISK DRIVE DEVICE OR THE LIKE

This is a continuation of application Ser. No. 08/358,432, filed Dec. 20, 1994 now abandoned.

FIELD OF THE INVENTION

The present invention pertains to components of a magnetic storage device or disk drive device, and more particularly pertains to a magnetic air bearing slider providing consistent flying height over the various tracks of a disk.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks that extend circumferentially around the disk. Each data track can store data in the form of magnetic transitions on the disk surface.

An interactive element, such as a magnetic transducer, is used to sense the magnetic transitions to read data, or to generate an electric current that causes a magnetic transition on the disk surface, to write data. The magnetic transducer is mounted within a head and includes a read/write gap that contains the active elements of the transducer at a position suitable for interaction with the magnetic surface of the disk.

The head is mounted by a rotary actuator and is selectively positioned by the actuator over a preselected data track of the disk to enable the transducer to either read data from or write data to the preselected data track of the disk, as the disk rotates below the transducer.

In modern disk drives, a relatively rigid or hard disk is used as the magnetic medium. The head includes a slider forming an air bearing surface that causes the transducer to fly above the data tracks of the disk surface due to fluid currents caused by rotation of the disk. Thus, the transducer does not physically contact the disk surface during normal operation of the disk drive. The amount of distance that the transducer flies above the disk surface is referred to as the "fly height." One advantageous type of head structure that operates at a fly height over the disk surface is a Transverse Pressure Contour (TPC) head. Current disk drive designs using a TPC head seek to limit the fly height to approximately 2 μ inches above the disk surface. Any contact between the head and the disk surface may result in damage to the disk or head. Accordingly, it is important to maintain an adequate fly height whenever the actuator positions the transducer over data tracks while the disk is rotating.

It is generally an objective to achieve an overall fly height that brings the read/write gap of the transducer as close to the disk surface as possible and to maintain the fly height at an even level regardless of the radial position of the actuator. The closer the active read/write gap of the transducer is brought to the surface of the disk, the stronger the electric signal generated by the transducer due to a magnetic transition on the disk surface which represents data. It is generally advantageous to develop as strong a data signal as possible, to insure reliable electrical performance of the disk drive.

A problem generally encountered with sliders is that the fly height varies over the various tracks of the disk, as a function of the radial position of the actuator. Thus, at certain data tracks, the fly height is greater than at other data tracks. Accordingly, the data signal is not as strong as possible at all data tracks. Several designs have been proposed to improve the stability of fly height of the slider.

For example, the TPC slider mentioned above has two rails in a "catamaran" configuration. Transverse pressurization contours are provided along each side edge of the bearing surfaces. For each bearing surface, a skew angle (i.e., the angle between the axis of the slider (determined by the radial position of the actuator) and the tangential velocity of the magnetic disk) for the slider causes a pressurization at the contour of the bearing surface impinging upon the air flow from the disk and expansion adjacent to the contour of the bearing surface away from this air flow.

In certain other known slider designs, recesses are provided in the face of the slider facing the rotating disk to provide for sub-ambient pressure (i.e., less than 1 atm of pressure) between portions of the slider and the disk causing the slider to be pulled toward the rotating disk during operation. The sub-ambient pressure effects counteract, to some extent, the operation of the slider tending to lift the head from the disk surface. The net result is a tighter, stiff control over the fly height, that ideally resists changes in fly height.

In another slider design, chevrons or grooves are provided in the air bearing surfaces which allow flow of air between a sub-ambient, central recess and the areas external to the slider. In doing so, an improvement in roll of the slider is achieved. In another catamaran slider design, each air bearing surface is made narrower towards the central part of the slider to maintain as near a constant air bearing surface area for each skew angle over the surface of the disk.

There is a need for a slider design that provides improved control over fly height variations over the data tracks of the magnetic disk, regardless of the radial position of the actuator. There is also a need for a slider design that decreases the roll angle of a slider.

SUMMARY OF THE INVENTION

These and other needs are satisfied by the sub-ambient pressure slider of the present invention. The slider includes first and second rails extending along the bottom side of the slider from a leading edge of the slider to a trailing edge of the slider. The bottom side of the slider being the side that faces a rotating disk. One skilled in the art will appreciate that the bottom side of the slider of the present invention will face up if mounted on an arm underneath a rotating disk and will face down if mounted on an arm over a rotating disk.

Each of the first and second rails includes a thigh region extending at an angle from the leading edge to a lateral side of the slider, a foot region extending at an angle from the lateral side of the slider toward the trailing edge of the slider, and a knee region at the lateral side of the slider coupling the foot region to the thigh region. First and second thigh recesses are located towards the lateral side of each of the respective thigh regions of the first and second rails. First and second foot recesses are located on the bottom side of the slider towards the lateral side of each respective foot region of the first and second rails. A central recess is located on the bottom side of the slider between the thigh, knee, and foot regions of the first and second rails.

The first and second rails can have an approximately equal, uniform height, while the first and second thigh recesses, first and second foot recesses, and the central recess can have an approximately equal, uniform depth.

In an alternative embodiment of the present invention, at least one tail is provided extending from the leading edge of the slider toward the trailing edge of the slider and divides the central recess into at least two sections. In doing so, pressure shifts to one lateral side of the slider is avoided.

As in conventional sliders, a taper can be provided at a leading edge of the slider for channeling air flow to the bottom side of the slider. Also, a front section can be provided which extends from one lateral side of the slider to the opposing, lateral side of the slider. The front section and one or more tails can have a uniform height equal to that of the first and second rails.

In another embodiment of the present invention a central recess for the slider is fabricated having an approximately uniform depth. The uniform depth of the central recess is chosen such that a flying height of the slider over the tracks of the rotating disk is most insensitive to fluctuations in the chosen uniform depth. This uniform depth can be chosen so that the flying height as a function of recess depth is approximately at a minimum for all tracks of the rotating disk.

The slider design of the present invention provides for a more uniform flying height across the tracks of the disk. The addition of the one or more tails allows for a better control of the roll of the slider.

DETAILED DESCRIPTION

Figure 1:
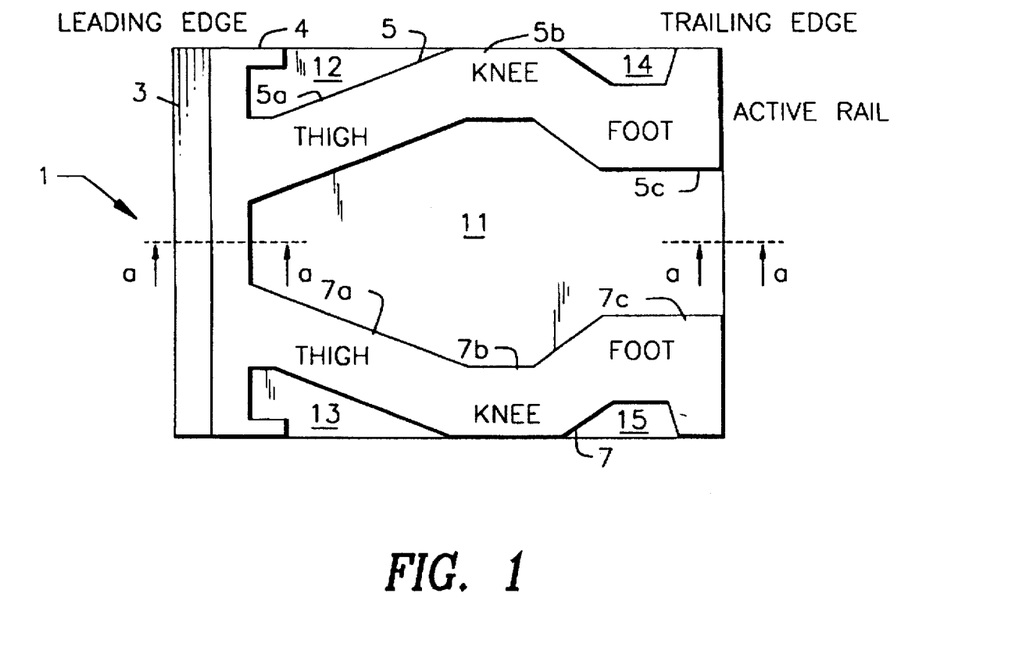
FIG. 1 is a top view of an embodiment of the slider of the present invention.
Figure 2:
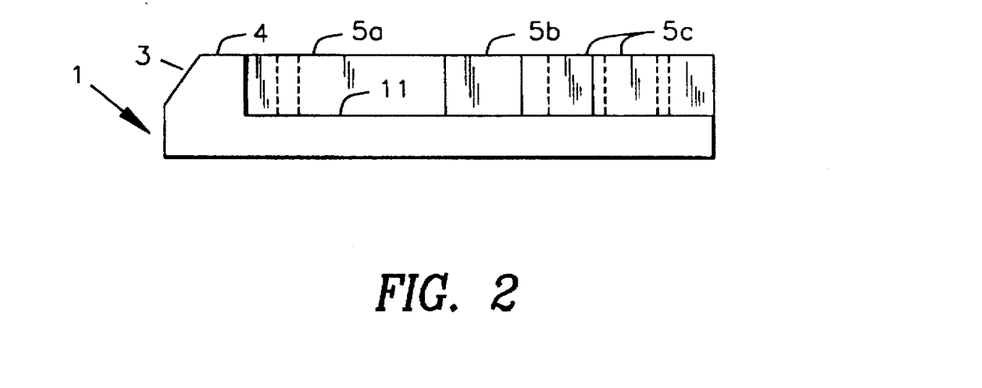
FIG. 2 is a side view along line a—a of FIG. 1.

Referring to FIGS. 1 and 2, an exemplary embodiment of the sub-ambient pressure slider of the present invention is shown. The slider 1 includes a taper 3 at the leading edge of the slider 1 which channels air flow underneath the slider 1. In this embodiment, the width of the slider 1 and the taper 3 is 60 mils (i.e., 0.06 inches) while the length and depth of the taper 3 is 8 mils. The taper 3 can lead into a front section 4. Along the length of the slider two rails 5, 7 are provided that vary significantly from the catamaran design known in the art. Each rail 5, 7 includes three major sections: a thigh section 5a, 7a; a knee section 5b, 7b; and a foot section 5c, 7c. In this embodiment, the front section 4 and all sections 5a–c, 7a–c of the rails 5, 7 of the slider 1 are at the same height (e.g., in this embodiment, the height of the slider is 17 mils).

Several recess sections 11–15 are provided in the slider. In this embodiment, all recesses 11–15 have the same depth (e.g., the depth of the recess regions is approximately 150 µ inches as measured from the top of the first and second rails 5, 7). The central recess 11 has a somewhat diamond shape due to the thigh sections and foot sections of the rails. Thigh recesses 12, 13 are located outside of the thigh regions 5a, 7a. Foot recesses 14, 15 are located outside of the foot regions 5c, 7c.

As is conventional in the art, a magnetic head (not shown specifically in FIGS. 1–2 is coupled at the rear of the slider 1, proximate to the foot region 5c (denoted "ACTIVE RAIL" in FIG. 1).

Figure 3:
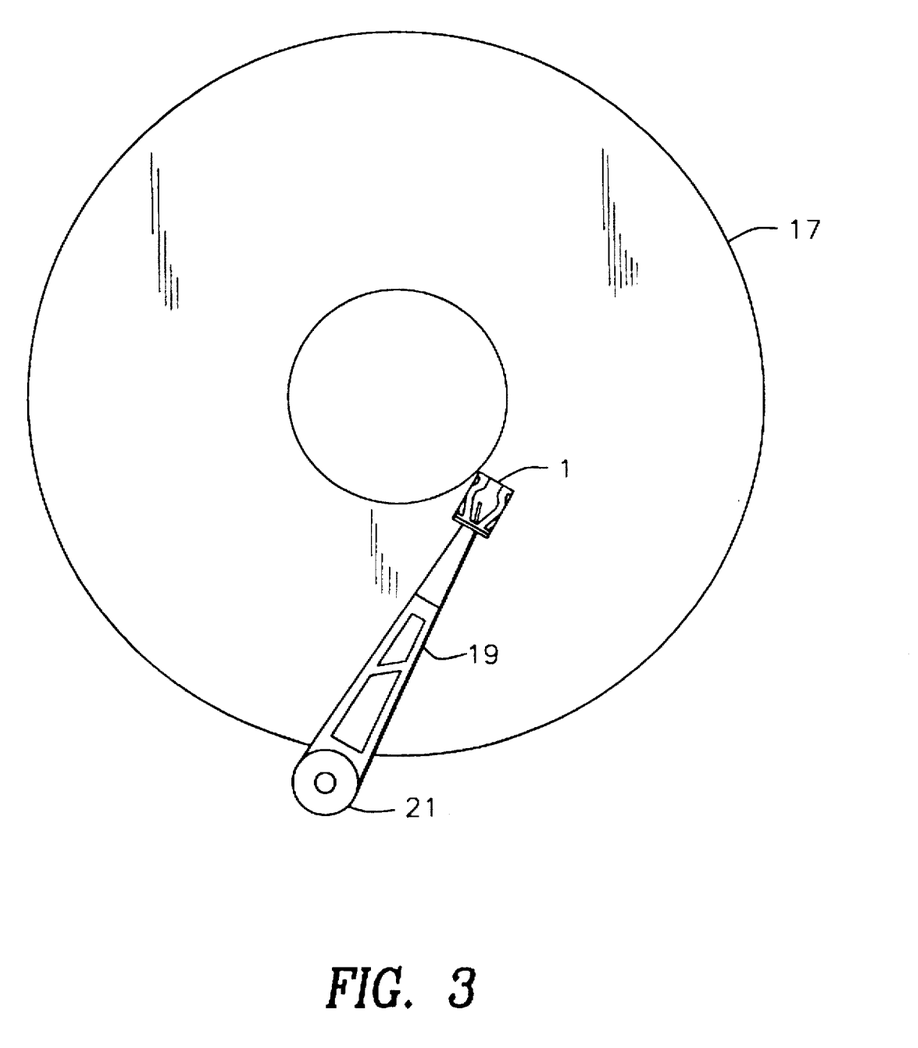
FIG. 3 is a overhead view of an assembly for positioning a slider over the innermost track of a disk.
Figure 4:
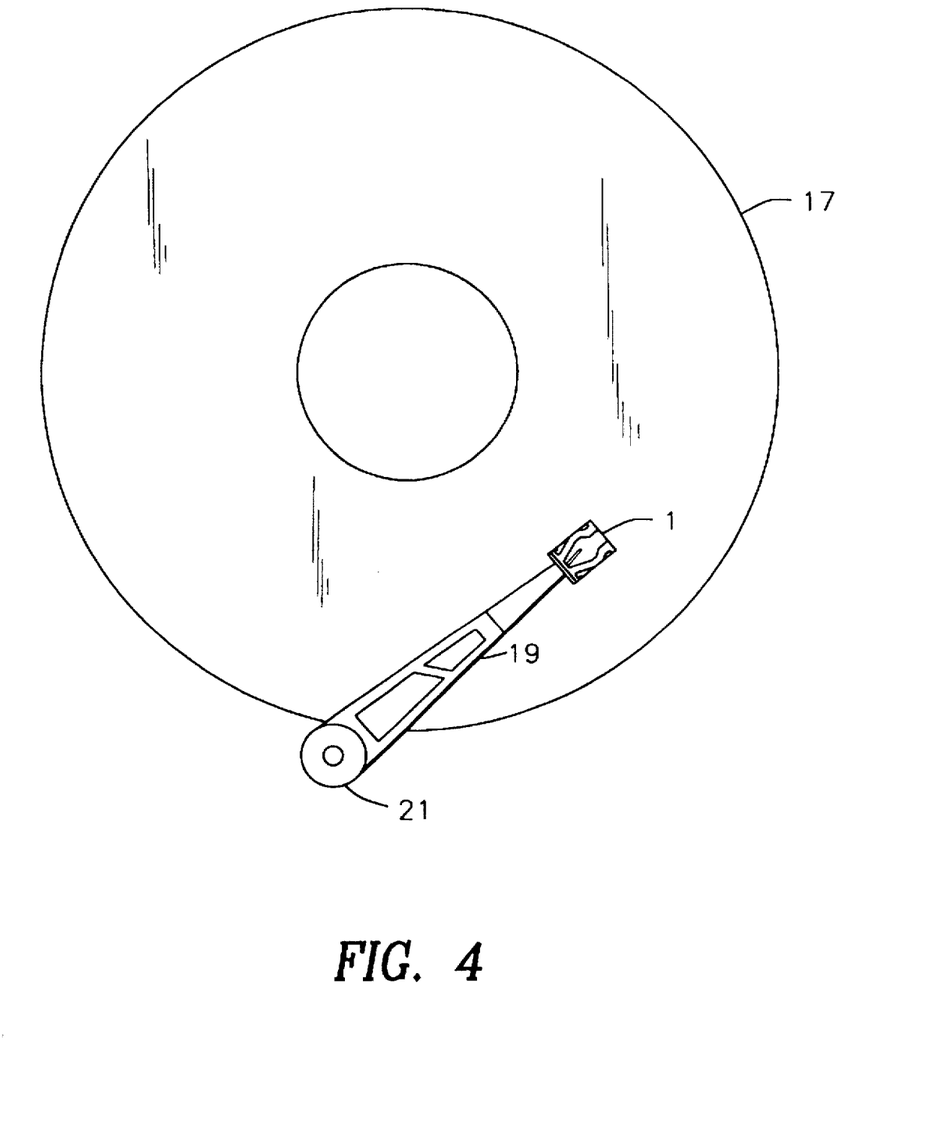
FIG. 4 is a overhead view of an assembly for positioning a slider over the middle track of a disk.
Figure 5:
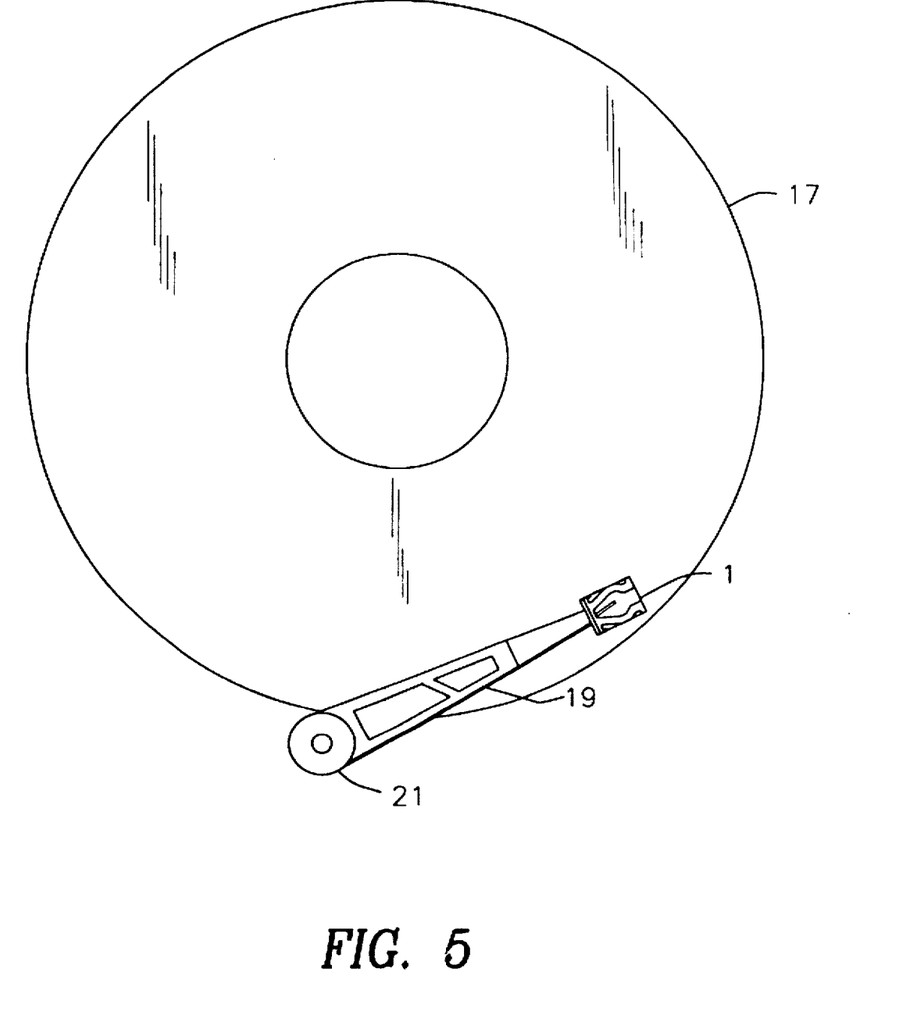
FIG. 5 is a overhead view of an assembly for positioning a slider over the outermost track of a disk.

Operation of the slider of the present invention is shown with respect to FIGS. 3–5. As the disk 17 rotates, air is channeled by the taper 3 of the slider 1 to flow underneath the slider. It should be noted that the taper 3 also assists in a fast take-off of the slider 1 when the disk 17 is initially rotated. Air is pressurized underneath the rails 5, 7 of the slider which causes the slider 1 (and thus the magnetic head) to lift off of the surface of the disk 17. In the recess regions 11–15, air "expands" to the sub-ambient pressure which generates a suction force causing the slider (and thus the magnetic head) to be pulled toward the moving disk.

In FIGS. 3–5, the slider 1 is shown mounted to an arm 19 and an actuator 21, which positions the slider 1 and magnetic head over a desired track. In FIG. 3, the slider 1 is positioned proximately to the innermost track of the disk 17. Referring again to FIG. 1, the thigh regions 5a, 7a of the first and second rails 5, 7 extend from the front, middle part of the slider 1 outward to two opposing sides of the slider where the knee sections 5b, 7b meet the sides of the slider. The angle that the thigh regions 5a, 7a make with the forward region 4 is designed to be approximately the same as the slider skew angle when the slider is present at the innermost track. The innermost track is also known as the contact start-stop (CSS) zone. At the innermost track (hereinafter referred to as the inner diameter or "ID"), the disk surface velocity is at its lowest. The orientation of the thigh regions 5a, 7a assists in preventing pressure underneath the first and second rails 5, 7 from leaking to the sides of the slider 1 (thus causing the slider to fly at a lower than desired height).

Referring to FIG. 4, the slider 1 is positioned approximately at the middle track (i.e., the track at a mean distance between the inner and outer tracks). At the middle track the skew angle is approximately zero. Because of the design of the thigh regions 5a, 7a of the slider 1, pressure leakage to the sides of these regions is greater. The loss of pressure due to leakage at the thigh regions 5a, 7a is compensated by the increase in surface velocity of the disk 17. The flying height of the slider 1 would be at its greatest at the middle track except for the action of the foot recesses 14, 15, which act to reduce the area of pressurization for the slider 1 and, thus, reducing the lift force generated at the foot sections 5c, 7c of the first and second rails 5, 7.

Referring to FIG. 5, the slider 1 and magnetic head are placed over the outermost track (hereinafter referred to as the outer diameter or "OD"). The large skew angle at the OD causes a greater amount of pressure to leak to the sides of the rails 5, 7. Because of the design of the thigh regions 5a, 7a of the slider 1, very little pressure is generated at these regions because of the relatively small pad length. Most of the pressure under the slider is generated under the knee regions 5b, 7b of the slider 1. Although, the pad area below the knee is small, the large disk surface velocity at the OD gives generates enough pressure to under the rails 5, 7 of the slider 1 to maintain a constant flying height.

As mentioned above, the recess regions 11–15 generate sub-ambient pressure that pulls the slider towards the disk surface. The majority of the sub-ambient pressure is formed at the central recess 11. The thigh recesses 12, 13 provide extra roll stiffness for the slider 1. The foot recesses 14, 15 reduce the effective pressurization area at the foot of the slider 1 so that it will not fly too high above the disk surface at a near zero skew angle. Also, the foot recesses 14, 15 reshape the foot regions 5c, 7c, of the rails 5, 7 so that these regions are parallel to the incoming air when the slider 1 is at an outer track. To this point, the flying height of the outer rail (i.e., rail 5) has been controlled by the design of the slider. To control slider roll (i.e., the difference in flying height of the innermost rail 7 and the outermost rail 5), the shape of the inner rail (i.e., rail 7) can be adjusted in a like manner to control the flying height of the inner rail.

Figure 1A:
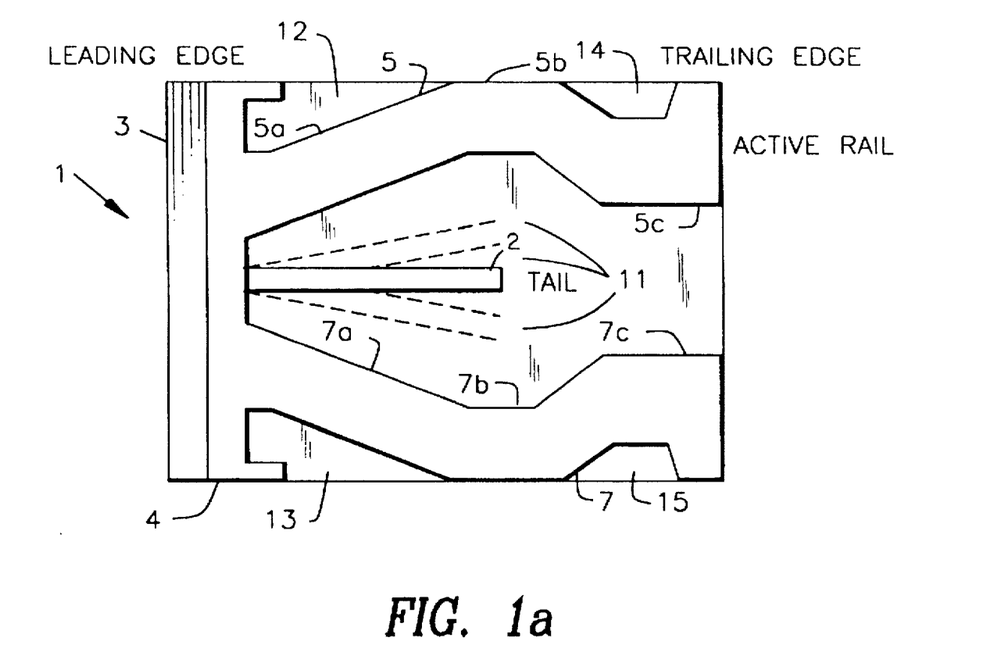
FIGS. 1a and 1b are top views of an additional embodiment of the slider of FIG. 1 having a tail to control flying height and roll angle.
Figure 1B:
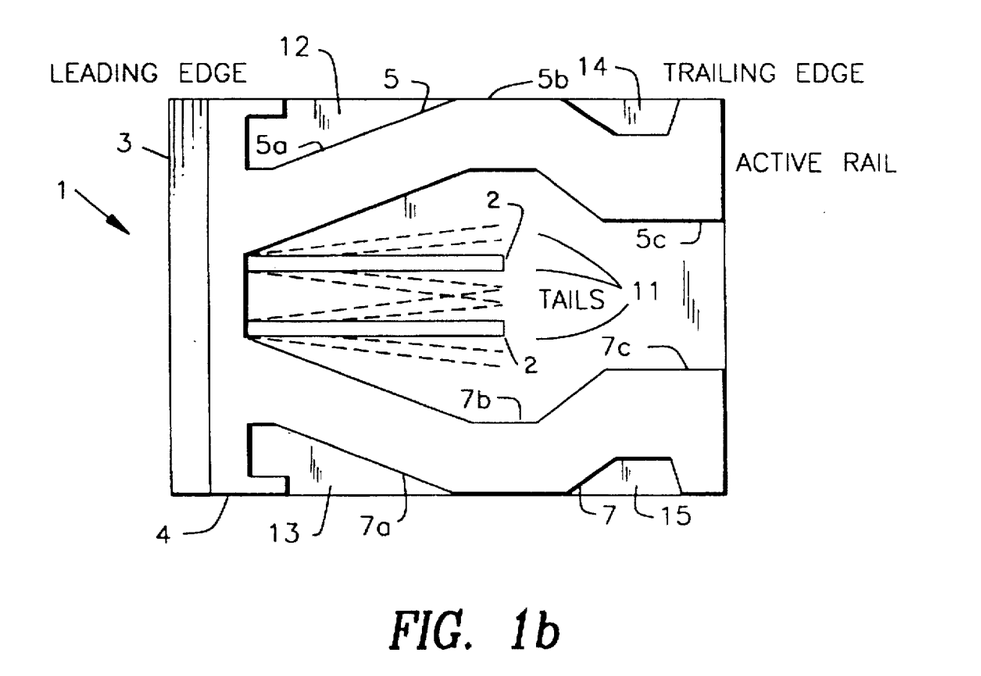

A further embodiment of the present invention is shown in FIGS. 1a and 1b. The central recess 11 of the slider 1 is the largest receptacle for sub-ambient pressure in the slider. The central recess 11 has a large effect on how constant the flying height of the slider 1 is over the surface of the disk 17 as well as the amount of roll for the slider 1. As an additional measure for controlling flying height and roll for the slider 1, one or more tails 2 are "added" to the central recess 11. In the manufacture of the slider, the tail region(s) are formed by etching or removing the material around them as the central recess 11 is formed.

When the slider 1 has a large skew angle, the angle at which air flows under the slider 1 is also large. This results in pressure leakage to the sides of the rails 5, 7 causing the decrease in the pressure under the rails, and shift in the center of pressure. The decrease in the pressure results in lower flying height, and the shift in the center of pressure results in an increased roll angle. Also, the central recess 11 acts to couple the flying height of one rail to the deviation in dimensions of the other rail. Because of their relatively narrow configuration, the tail(s) 2 do not form an appreciably significant air bearing surface. Rather, the tail(s) 2 divide the central recess 11 into two or more volumes, thus preventing distribution of sub-ambient pressure within the central recess 11 from entirely shifting to one side of the slider 1. By optimizing the length and orientation of the tail(s) 2, the effect of suction force on the roll angle of the slider 1 can be controlled. The dashed lines in FIGS. 1a and 1b show possible orientations and lengths for the tails(s) 2. Also, the use of tail(s) 2 prevents the coupling of the flying height of one rail to the change in the dimension of the other.

Figure 1C:
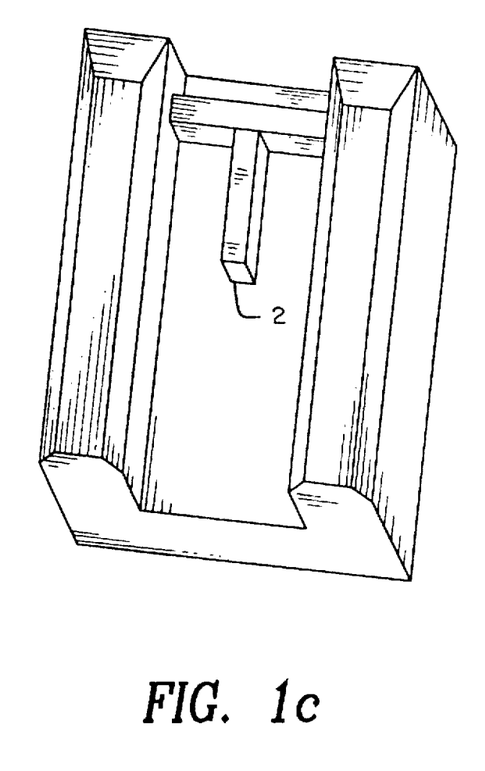
FIG. 1c shows a top view of a catamaran slider having one tail, to control flying height and roll angle according to an embodiment of the present invention.

Referring to FIG. 1c, a conventional catamaran slider is shown having tail 2 as described above.

Figure 6:
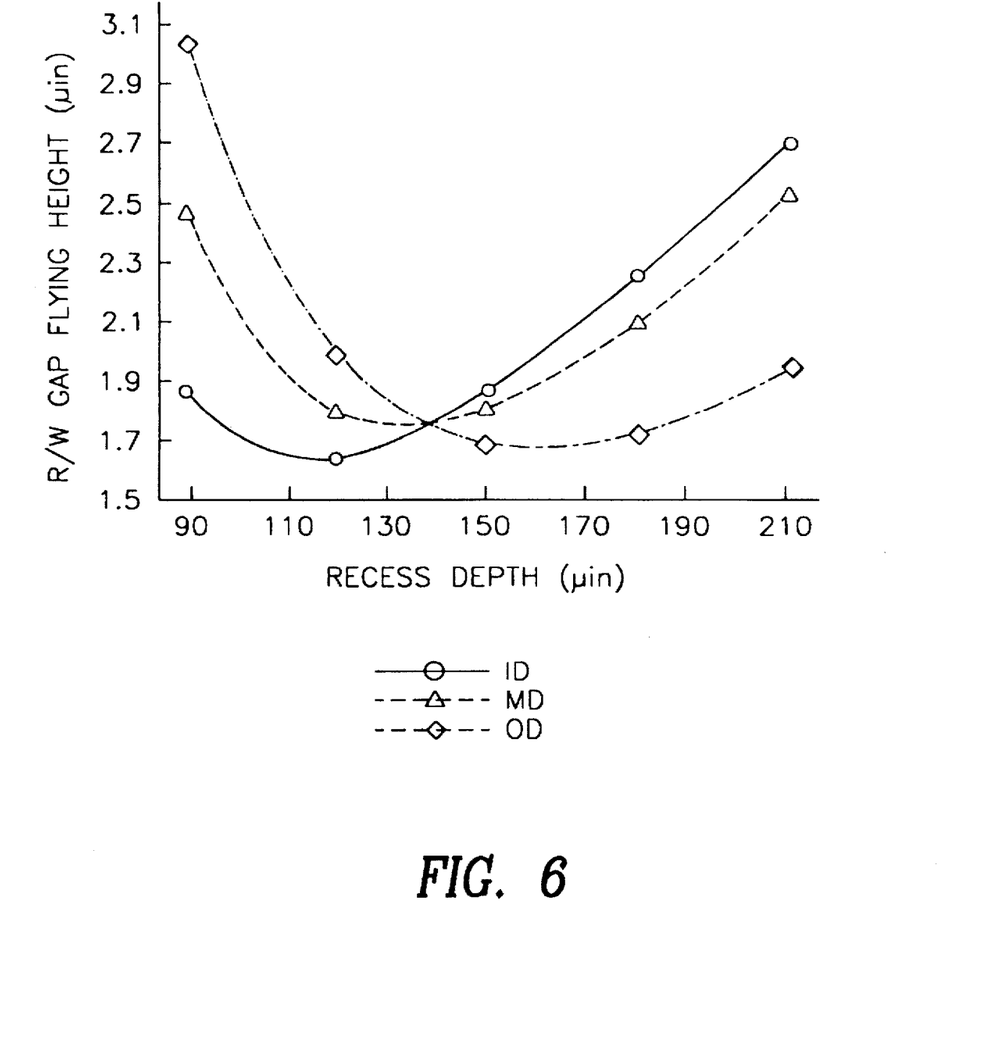
FIG. 6 is a graph of flying height versus recess depth of a slider.

The depth of the central recess 11 can have a substantial effect on flying height over all tracks of a disk. In high altitude environments, the change in pressure and the mean-free path of air can also have an effect on flying height. By choosing an appropriate depth for the central recess 11, the range of flying height values (i.e., the difference between the maximum and minimum flying height of the head over all tracks of a disk) can be substantially smaller than with typical catamaran-type sliders. Referring to FIG. 6, a graph is shown having flying height along the Y-axis and recess depth along the X-axis for the ID, middle diameter ("MD"), and OD (i.e., flying height is shown as a function of recess depth). With a typical recess depth of 200 microinches, the flying height for the slider will fall along steep slopes of the ID, MD, and OD curves. This will cause greater flying height sensitivity depending on the recess depth chosen and the altitude at which the slider is used. If a recess depth is chosen when the slopes of the ID, MD, and OD curves are at a minimum (i.e., the uniform depth is chosen such that the flying height as a function of recess depth is approximately at a minimum for all tracks of the rotating disk—in the 110–150 microinches range), the sensitivity of the slider to recess depth variations due to tolerances and operating altitude is minimized. Another advantage of choosing the recess using the aforementioned technique is that the air-bearing stiffness is maximized which helps in reducing the flying height sensitivity further.

We claim:

1. A sub-ambient pressure, air bearing slider for positioning a magnetic read/write head proximately to a rotating disk, said slider comprising:

first and second rails extending along the bottom side of said slider from a leading edge of said slider to a trailing edge of said slider, said bottom side of said slider for facing a rotating disk, each of said first and second rails including:
a thigh extending at an angle from said leading edge to a generally perpendicular lateral edge of said slider;
a foot having a first part extending inwardly at an angle from said lateral edge of said slider, a second part extending from the first part in a direction generally parallel with the lateral edge to the trailing edge, and a third part extending from the second part along the trailing edge to the lateral edge of said slider wherein the trailing edge is generally perpendicular to the lateral edge; and
a knee at said lateral side of said slider coupling said foot to said thigh;
wherein said first and second rails form first and second thigh recesses located towards and extending to the lateral side of said respective thighs;
wherein said first and second rails form first and second foot recesses located on the bottom side of said slider towards and extending to the lateral edge of said respective feet wherein said rails separate respective foot and thigh recesses from each other; and
wherein said first and second rails form a central recess located on the bottom side of said slider between said thighs, knees, and feet.

2. The slider of claim 1 wherein said first and second rails have an approximately equal, uniform height.

3. The slider of claim 2 wherein said first and second thigh recesses, first and second foot recesses, and said central recess have an approximately equal, uniform depth.

4. The slider of claim 1 wherein said first and second thigh recesses, first and second foot recesses, and said central recess have an approximately equal, uniform depth.

5. The slider of claim 1 further comprising:
at least one tail extending from the leading edge of said slider toward the trailing edge of said slider and dividing said central recess into at least two sections.

6. The slider of claim 5 wherein each tail and said first and second rails have an approximately equal, uniform height.

7. The slider of claim 5 wherein each tail extends at an angle from the leading edge of said slider.

8. The slider of claim 5 wherein each tail has a width substantially narrower than a width of each of said first and second rails.

9. The slider of claim 1 wherein the angle at which the thigh regions extend from the leading edge of said slider is approximately equal to a slider skew angle when the slider is present at an innermost track of the rotating disk.

10. A sub-ambient pressure, air bearing slider for positioning a magnetic read/write head proximately to a rotating disk, said slider comprising:
a taper formed at a leading edge of said slider, said taper channeling air flow to a bottom side of said slider, said bottom side of said slider for facing a rotating disk;

a front section extending from a first lateral edge of said slider to a second lateral edge of said slider;

first and second rails extending along the bottom side of said slider from the front section of said slider to a trailing edge of said slider, each of said first and second rails including:

a thigh region extending at an angle from said leading edge to one of said lateral edges of said slider;

a continuous foot region having first part extending inwardly at an angle from one of said lateral edges of said slider, a second part extending in a direction generally parallel with the lateral edges to the trailing edge of said slider, and a third part extending outwardly along the trailing edge to the lateral edge of said slider; and     a knee region at one of said lateral sides of said slider coupling said foot region to said thigh region;

first and second thigh recesses located towards and along the lateral edge of said respective thigh regions of said first and second rails;

first and second foot recesses located on the bottom side of said slider towards and along one of the lateral edges of said respective foot regions of said first and second rails; and a central recess located on the bottom side of said slider between said thigh, knee, and foot regions of said first and second rails.

11. The slider of claim 10 wherein said front section and said first and second rails have an approximately equal, uniform height.

12. The slider of claim 11 wherein said first and second thigh recesses, first and second foot recesses, and said central recess have an approximately equal, uniform depth.

13. The slider of claim 10 wherein said first and second thigh recesses, first and second foot recesses, and said central recess have an approximately equal, uniform depth.

14. The slider of claim 10 further comprising:

at least one tail extending from the leading edge of said slider toward the trailing edge of said slider and dividing said central recess into at least two sections.

15. The slider of claim 14 wherein each tail and said first and second rails have an approximately equal, uniform height.

16. The slider of claim 14 wherein each tail extends at an angle from the leading edge of said slider.

17. The slider of claim 14 wherein each tail has a width substantially narrower than a width of each of said first and second rails.

18. The slider of claim 10 wherein the angle at which the thigh regions extend from the leading edge of said slider is approximately equal to a slider skew angle when the slider is present at an innermost track of the rotating disk.

19. The slider of claim 10 wherein said rails separate said respective foot and thigh recesses.

20. A sub-ambient pressure, air bearing slider for positioning a magnetic read/write head proximately to a rotating disk, said slider comprising:

a taper formed at a leading edge of said slider, said taper channeling air flow to a bottom side of said slider, said bottom side of said slider for facing a rotating disk;

a front section extending from a first lateral edge of said slider to a second lateral edge of said slider;

first and second rails extending along the bottom side of said slider from the front section of said slider toward the trailing edge of said slider and generally along the first and second lateral edges, respectively, the first and second rails each having a thigh extending outwardly at an angle from the front section toward the respective lateral edge of the slider, which forms a recessed area that is bounded by the front section, the thigh and the respective lateral edge;

a central recess located on the bottom side of said slider between said first and second rails; and     at least one tail extending from the front section of said slider toward the trailing edge of said slider and dividing said central recess into at least two sections.

21. The slider of claim 20 wherein said central recess has an approximately equal, uniform depth.

22. The slider of claim 20 wherein each tail extends at an angle from the leading edge of said slider.

23. The slider of claim 20 wherein each tail has a width substantially narrower than a width of each of said first and second rails.

24. The slider of claim 20 wherein said front section, each of said tails and said first and second rails have an approximately equal, uniform height.

* * * * *

UNITED STATES PATENT AND TRADEMARK OFFICE
CERTIFICATE OF CORRECTION

PATENT NO.   : 5,739,981
DATED        : April 14, 1998
INVENTOR(S)  : Ellis Taeho Cha and Jia-Kuen Jerry Lee It is certified that error appears in the above-indentified patent and that said Letters Patent is hereby corrected as shown below: On the title page Insert "[73] Assignee: Seagate Technology, Inc., 920 Disc Drive, Scotts Valley, CA 95066"

Signed and Sealed this

First Day of June, 1999

Attest:

Attesting Officer

Q. TODD DICKINSON

Acting Commissioner of Patents and Trademarks